United States Patent

Iwano et al.

Patent Number: 5,281,377
Date of Patent: Jan. 25, 1994

[54] PROCESS FOR THE PRODUCTION OF FOAMED POLYOLEFIN SHEETS

[75] Inventors: Shoji Iwano, Kamitsuga; Kouichi Wakabayashi, Kanuma; Yoshihisa Ishihara, Utsonomiya, all of Japan

[73] Assignee: Japan Styrene Paper Corporation, Tokyo, Japan

[21] Appl. No.: 960,263

[22] Filed: Oct. 13, 1992

Related U.S. Application Data

[63] Continuation-in-part of Ser. No. 826,424, Jan. 27, 1992, abandoned, which is a continuation-in-part of Ser. No. 433,157, Nov. 8, 1989, abandoned.

[51] Int. Cl.$^5$ .............................................. B29D 7/00
[52] U.S. Cl. ........................................ 264/51; 264/55; 264/209.4; 264/210.7; 264/565
[58] Field of Search .............. 264/51, 55, 209.4, 210.7, 264/565, 566, 568

[56] References Cited

U.S. PATENT DOCUMENTS

| | | | |
|---|---|---|---|
| 2,433,937 | 1/1948 | Tornberg | 264/559 |
| 2,987,765 | 6/1961 | CiChelli | 264/565 |
| 3,311,681 | 3/1967 | Cherney et al. | 264/53 |
| 3,619,445 | 11/1971 | Carlson, Jr. | 264/565 |
| 4,165,356 | 8/1979 | Heider | 264/565 |
| 4,426,065 | 1/1984 | Komatsuzaki et al. | 264/53 |
| 4,487,731 | 12/1984 | Kobayashi | 264/51 |

Primary Examiner—David A. Simmons
Assistant Examiner—William J. Matney, Jr.
Attorney, Agent, or Firm—Sherman and Shalloway

[57] ABSTRACT

A foamed polyolefin sheet is formed by extruding a molten polyolefin resin, which contains a blowing agent, into a low-pressure zone through an annular die provided at an end of the extruder to form a foamed tubular body, bringing the foamed tubular body into contact with a peripheral surface of a cylindrical cooling device to cool the foamed tubular body and then slitting the thus-cooled foamed tubular body and then slitting the thus-cooled foamed tubular body in the direction of extrusion to open same. The cylindrical cooling device is divided into an upstream section and at least one other spaced downstream sections. The internal pressure of the foamed tubular body is increased to from about $5 \times 10^{-4}$ to $3 \times 10^{-2}$ kg/cm$^2$ (G) between the die and the upstream section of the cylindrical cooling device and also between at least two adjacent sections of the cylindrical cooling device to apply tension to the foamed tubular body at the inner wall and prevent the formation of corrugations.

4 Claims, 1 Drawing Sheet

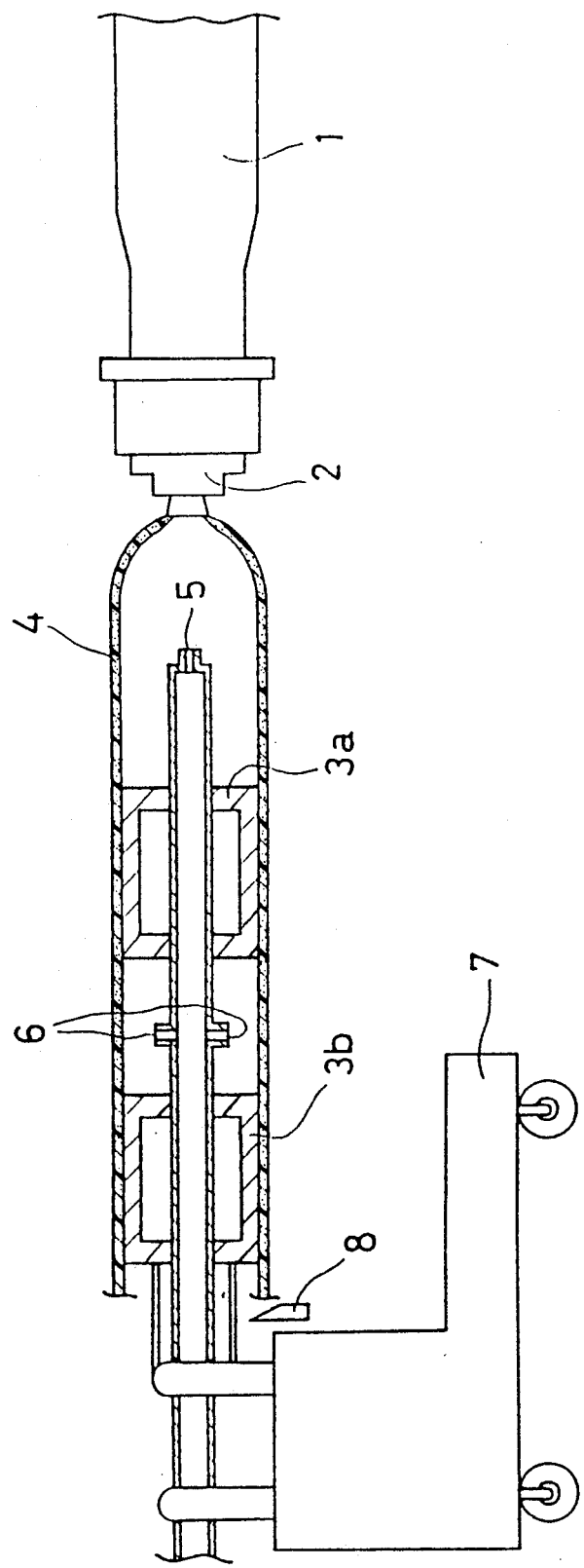

PROCESS FOR THE PRODUCTION OF FOAMED POLYOLEFIN SHEETS

This application is a continuation-in-part of application Ser. No. 07/826,424, filed Jan. 27, 1992, which is a continuation-in-part of application Ser. No. 07/433,157, filed Nov. 8, 1989, both applications are now abandoned.

BACKGROUND OF THE INVENTION

1) Field of the Invention

This invention relates to a process for the production of a foamed polyolefin sheet.

2) Description of the Related Art

Conventionally, foamed polyolefin sheets have each been produced by extruding a polyolefin resin, which contains a blowing agent, into a low-pressure zone through an annular die provided at an end of an extruder to form a foamed tubular body, bringing the foamed tubular body into contact with a peripheral surface of a cylindrical cooling device to cool the foamed tubular body and then slitting the thus-cooled foamed tubular body in the direction of extrusion to open same. In this conventional process, it is however difficult to increase the ratio (blow ratio) of the diameter of the annular die to the diameter of the cylindrical cooling device because the extensibility of the extruded foamed tubular body drops abruptly. When the blow ratio is small, the foamed tubular body cannot be extended sufficiently. As a result, corrugations occur in the resulting foamed sheet, resulting in problems such that these corrugations deteriorate the external appearance of the product, lower the accuracy upon cutting the sheet and also reduce the accuracy of bonding namely, form portions having good strength and those having poor strength when employed for lamination. It is preferred that a blowing agent employed for the production of such foamed sheets is inexpensive. Economical butane is suitable from this standpoint. The use of a blowing agent having a high foaming speed, like butane, is accompanied by the problem that the occurrence of corrugations becomes particularly remarkable. It has therefore been desired to develop a process which can provide foamed polyolefin sheets, which contain less corrugations, by using an inexpensive blowing agent such as butane.

SUMMARY OF THE INVENTION

The present invention has been completed to solve the above-described drawbacks of the conventional art. It is therefore an object of the present invention to provide a process for the production of a foamed polyolefin sheet containing much less corrugations compared to the conventional processes.

In one aspect of this invention, there is thus provided a process for producing a foamed polyolefin sheet by extruding a molten polyolefin resin, which contains a blowing agent, into a low-pressure zone through an annular die provided at an end of an extruder to form a foamed tubular body, bringing the foamed tubular body into contact with a peripheral surface of a cylindrical cooling device to cool the foamed tubular body and then slitting the thus-cooled foamed tubular body in the direction of extrusion to open same, which process comprises:

dividing the cylindrical cooling device into at least two sections; and increasing the internal pressure of the foamed tubular body between the die and the upstream section of the cylindrical cooling device and also between at least two adjacent sections of the cylindrical cooling device to apply tension to the foamed tubular body at the inner wall.

In a preferred embodiment, 1–40 parts by weight of butane may be used as the blowing agent per 100 parts by weight of low-density polyethylene to provide a foamed polyethylene sheet having an expansion ratio of 15 times or higher, e.g., 15–100 times.

In another preferred embodiment, the die and the device may satisfy the following equations:

$$DD/MD = 0.5 \text{ and}$$

wherein DD is a ring diameter of the annular die and MD the maximum diameter of the cylindrical cooling device, all expressed in terms of mm.

In a further preferred embodiment, the MD and ML of the cylindrical cooling device may be 150–1,000 mm and 300–15,000 mm, respectively.

In another aspect of this invention, an apparatus for carrying out the process of forming a foamed polyolefin sheet comprises:

a cylindrical cooling device provided in at least two sections for cooling a foamed tubular body extruded through an annular die which is provided at an end of an extruder;

air outlets arranged between the annular die and the most upstream section of cylindrical cooling device and between at least two adjacent sections of the cylindrical cooling device, respectively, thereby cooling and increasing the internal pressure of the thus-cooled foamed tubular body and applying tension to the foamed tubular body at the inner wall; and a means for slitting the resultant foamed tubular body in the direction of extrusion to open same.

In a preferred embodiment, at least one of said at least two sections of the cylindrical cooling device may be movable.

In another preferred embodiment, the die and the device may satisfy the following equation:

$$DD/MD = 0.1 - 0.5 \text{ and}$$

wherein DD is a ring diameter of the annular die and MD the maximum diameter of the cylindrical cooling device all expressed in terms of mm.

In a further preferred embodiment, the MD and ML of the cylindrical cooling device may be 150–1,000 mm and 300–15,000 mm, respectively.

According to the process of the present invention, the internal pressure of the foamed tubular body extruded from the annular die of the extruder is increased between the annular die and the most upstream section of cylindrical cooling device and also between at least two adjacent sections of the cylindrical cooling device which is divided into at least two sections. This has made it possible to obtain a foamed polyolefin sheet which contains less corrugations compared to those obtained by the conventional process. Further, corrugations can be effectively reduced further by limiting DD/MD to 0.1–0.5 and/or MD and ML to 150–1,000 mm and 300–15,000 mm, respectively. Corrugations tend to occur especially when a composition comprising 100 parts by weight of low-density polyethylene and 1–40 parts by weight of butane is extruded at an expansion ratio of 15 times or higher. However, the process of this invention can effectively prevent occurrence of corrugations in such instances. On the other hand, the apparatus for carrying out the process according to this invention include air outlets arranged between the annular die and the most upstream section of cylindrical cooling device and also between at least two adjacent sections of the cylindrical cooling device, respectively, thereby cooling and increasing the internal pressure of the thus-cooled foamed tubular body and hence applying tension to the foamed tubular body at the inner wall. The apparatus therefore permits practice of the process of this invention without failure. When at least one of the sections of the cylindrical cooling device is rendered movable, a desired MD/ML ratio can be chosen. As a result, this has the advantage that said at least one section of the cylindrical cooling device can be placed at a position optimal for the reduction of corrugations depending on the kinds and proportions of the resin and blowing agent employed.

BRIEF DESCRIPTION OF THE DRAWING

The above and other objects, features and advantages of the present invention will become apparent from the following description of the invention and the appended claims, taken in conjunction with the accompanying sole drawing, which illustrates one embodiment of this invention, namely, which is a partly cut-away schematic side view showing the production of a foamed sheet by a production apparatus according to this invention.

DETAILED DESCRIPTION OF THE INVENTION AND PREFERRED EMBODIMENT

The term "polyolefin resin" as used herein may include high-density polyethylene, low-density polyethylene, linear low-density polyethylene, polypropylene, polybutene-1, ethylene-propylene copolymers, ethylene-vinyl acetate copolymers containing at least 60 wt. % of the ethylene component, ethylene-styrene graft copolymers, ethylene-vinyl chloride copolymers, etc.

Examples of the blowing agent used in the process of the present invention may include aliphatic hydrocarbons and alicyclic hydrocarbons such as propane, butane, pentane, hexane, cyclobutane and cyclopentane; volatile blowing agents such as halogenated hydrocarbons, e.g., monochlorodifluoromethane, trichlorofluoromethane, dichlorodifluoromethane, dichlorotetrafluoromethane, methyl chloride, ethyl chloride and methylene chloride; decomposable blowing agents such as azodicarbonamide, N.N'-dinitrosopentamethylenetetramine, azobisisobutyronitrile, p,p'-oxybis(-benzene sulfonyl hydrazide) and sodium bicarbonate.

The preferred range of the mixing ratio of the polyolefin resin to the blowing agent varies depending on the kinds of the polyolefin resin and blowing agent employed. When low-density polyethylene and butane are used as polyolefin resin and blowing agent respectively by way of example, butane is generally used in an amount of 1–40 parts by weight, preferably 10–30 parts by weight per 100 parts by weight of low-density polyethylene.

According to the process of this invention, a foamable polyolefin resin which has been formed by melting and kneading the polyolefin resin and blowing agent in an extruder is extruded into a low-pressure zone through an annular die provided at an end of the extruder, whereby the foamable polyolefin resin is formed into a foamed tubular body. The foamed tubular body is then brought into contact with a peripheral surface of a cylindrical cooling device divided into at least two sections. The process of the resent invention also features that the internal pressure of the foamed tubular body is increased from out $5 \times 10^{-4}$ to $3 \times 10^{-2}$ kg/cm$^2$ (G), preferably from about $1 \times 10^{-3}$ to $1 \times 10^{-2}$ kg/cm$^2$ (G), to apply tension to the inner wall of the foamed tubular body between the annular die and the upstream section of cylindrical cooling device and also between at least two sections of the cylindrical cooling device. As a method for cooling the foamed tubular body and also for increasing the internal pressure of the foamed tubular body, it may be mentioned to feed air into the interior of the foamed tubular body.

Thus, the present invention features the step of applying tension to the tube at its inner wall and the step of cooling the tube without applying any tension are separately carried out to subject the tube to repeated application of tension and cooling.

In the present invention, it is preferred to limit the ratio of the ring diameter (DD) of the annular die to the maximum diameter (MD) of the cylindrical cooling device, DD/MD (i.e., blow ratio), to 0.1–0.5. The ratio of the maximum diameter of the cylindrical cooling device (MD) to the length (ML) from the upstream end of the upstream section of the cylindrical cooling device to the downstream end of the most downstream section of the cylindrical cooling device, MD/ML, should preferably satisfy the inequality 0.28 > MD/ML > 0.04. Similarly, the ratio of a length of a section of the cylindrical cooling device (ML') to the maximum diameter (MD) of the cylindrical cooling device, ML'/MD, should preferably satisfy the inequality 5 > ML'/MD > 1.5, more preferably, 5 > ML'/MD > 2.0; and the ratio of the length of an interval between adjacent sections of the cylindrical cooling device (MML) to the length (ML') of a section of the cylindrical cooling device, MML/ML', should preferably satisfy the inequality 3 > ML/ML' > 0.4.

The ratio (DD/MD) of DD to MD is required to fall within a range of 0.1–0.5 in order to provide a foamed sheet having an expansion ratio of 15 times or higher. In the case of DD/MD > 0.5, even if a foamed sheet having an expansion ratio of 15 times or higher is provided, difficulties are encountered on stably taking-off a foamed tubular body because the foamed tubular body can not be cooled sufficiently and, also, the occurrence of corrugations cannot be prevented. In the case of DD/MD < 0.1 on the other hand, there is a potential problem that the workability upon causing the foamed tubular body to pass through the cylindrical cooling device in such a manner that the inner wall of the foamed tubular body right after completion of the extrusion and expansion smoothly flows on the cylindrical cooling device becomes deteriorated and, moreover, excessive stretching force is applied to the tubular body, so that the physical properties of the foamed sheet and precision of thickness are lowered. The reason why the cylindrical cooling device is defined as 5 > ML'/MD > 1.5 is that there is a potential problem that in the case of ML'/MD ≦ 1.5, the cooling device tend to become insufficient, and in the case of ML'/MD ≦ 5 to the contrary, the foamed tubular body is overcooled, so that the effect brought about by applying tension to the tubular body at its inner wall becomes insufficient. Further, the reason why the cylindrical cooling device is defined as 3 > MML/ML' > 0.4 is as follows. The case of MML/ML'≦0.4 makes it difficult to apply sufficient tension to the tubular body at its inner wall, so that the effect to prevent the occurrence of corrugations cannot be attained like the case where a non-divided cooling device with ML' preset long is used. In the case of MML/ML'≧3, to the contrary, the tubular body sags by its own weight, and catches on the upstream end of the subsequent section of the cooling device, so that the taking off of the tubular body becomes difficult and the diameter of the tubular body is not constant. Therefore, there is a potential problem that the precision of the width and thickness of the resulting foamed sheet is deteriorated. Furthermore, the reason why the cylindrical cooling device is defined as 0.28>MD/ML>0.04 is that even if ML is made greater as MD/ML>0.04, the effect to prevent the occurrence of corrugations is not further improved, and in the case of MD/ML≧0.28, the cooling tends to become insufficient.

It is also preferred to limit the maximum diameter (MD) of the cylindrical cooling device to 150-1,000 mm and the length (ML) from the upstream end of the most upstream section of the cylindrical cooling device to the downstream end of the most downstream section of the cylindrical cooling device to 300-15,000 mm.

When DD, MD and ML are chosen as described above, it is possible to effectively reduce corrugations in foamed sheets to be obtained.

Incidentally, the outer diameter of the cylindrical cooling device is not constant along the entire length thereof. It varies depending on the location measured because of the existence of projections and/or raised portions. Therefore, the term "maximum diameter: MD of the cylindrical cooling device" as used herein means the diameter at the largest portion of the cylindrical cooling device.

The foamed tubular body which has been cooled by the cylindrical cooling device is then slit in the direction of extrusion, whereby a sheet having an expansion ratio of generally 15 times or higher, preferably 20-60 times is foamed.

When a sheet having an expansion ratio in the above range is obtained in this invention, a marked decrease of corrugations can be observed.

An apparatus which is suitable for use in the practice of the process of this invention, is illustrated in FIG. 1. Numeral 1 indicates an extruder equipped with an annular die 2 at one end thereof and symbols 3a, 3b designate a cylindrical cooling device divided into two sections. Although not shown in the figure, a cooling jacket is arranged on the inner peripheral wall of the cylindrical cooling device. A foamable polyolefin composition charged in the extruder 1 is extruded into a foamed tubular body 4 through the annular die 2 provided said one end of the extruder 1. The foamed tubular body 4 is then successively cooled by the sections 3a,3b of the cylindrical cooling device. Air is fed through an air outlet 5 of an air feed pipe, said air outlet 5 being arranged between the annular die 2 and the upstream section 3a of the cylindrical cooling device, thereby cooling the foamed tubular body and also increasing the internal pressure of the foamed tubular body 4. The air feed pipe has another air outlet 6 which is located between the upstream section 3a and downstream section 3b of the cylindrical cooling device. By the air fed through the air outlet 6, the internal pressure of the foamed tubular body 4 is also increased between the upstream section 3a and downstream section 3b of the cylindrical cooling device and at the same time, the foamed tubular body 4 is also cooled by the air thus fed. As described above, the value of DD/MD should preferably be 0.1-0.5. To permit adjustment of the length, ML, for example the downstream section 3b of the cylindrical cooling device is designed to be slidably movable on the air feed pipe by means of a drive means 7 in the apparatus of this invention. As an alternative, the downstream section 3b may be fixed and instead, the upstream section 3a may be arranged movably. Owing to the adoption of this design, the ratio, MD/ML, can be chosen as desired. Incidentally, numeral 8 indicates a cutting blade for slitting the foamed tubular body 4 in the direction of extrusion and hence opening same into a flat sheet.

It is to be noted that a mandrel such as that disclosed in U.S. Pat. No. 3,311,681 to J. A. Cherney can also be used in place of the cylindrical cooling device described above. The term "cylindrical cooling device" as used herein should therefore be interpreted in such a broad sense as embracing the mandrel of the above U.S. patent.

The present invention will hereinafter be described more specifically by the following examples.

EXAMPLE 1

Added as a blowing agent to low-density polyethylene in an extruder was 21.5 wt. % of butane. The resultant composition was melted and kneaded and then extruded at a discharge rate of 118 kg/hr through an annular die whose DD was 95 mm (DD=95 mm), whereby a foamed tubular body was formed. Air was fed at a flow velocity of 50 m$^3$/min into the foamed tubular body between the annular die and the upstream section of the cylindrical cooling device, so that the internal pressure of the foamed tubular body was increased and the tubular body was cooled. Thereafter, the foamed tubular body was cooled by means of a cylindrical cooling device divided into two sections. The MD and ML of the cylindrical cooling device were 350 mm and 3,000 mm, respectively (MD=350 mm; ML=3,000 mm). Therefore, the DD/MD and MD/ML were 0.27 and 0.12, respectively (DD/MD=0.27; MD/ML=0.12). Air was fed at a flow velocity of 50 m$^3$/min. into the foamed tubular body between the respective sections of the cylindrical cooling device, so that the foamed tubular body was cooled while increasing its internal pressure. The thus-cooled foamed tubular body was then slit open into a flat sheet. Physical properties of the resultant sheet are shown in Table 1.

COMPARATIVE EXAMPLE 1

Following the procedure of Example 1, the same blowing agent was added in the same amount to the same low-density polyethylene, followed by melting and kneading. The resultant composition was extruded at a discharge rate of 148 kg/hr through an annular die whose DD was 110 mm (DD=110 mm), thereby forming a foamed tubular body. Without increasing the internal pressure of the foamed tubular body, it was guided to a non-divided cylindrical cooling device whose MD and ML were 390 mm and 1,000 mm, respectively (MD=390 mm; ML=1,000 mm). Thereafter, the thus-cooled foamed tubular body was slit open into a generally flat sheet. Physical properties of the resultant sheet are also shown in Table 1.

TABLE 1

|  | Ex. 1 | Comp. Ex. 1 |
| --- | --- | --- |
| Thickness (mm) | 1.17 | 1.10 |
| Expansion ratio (times) | 37.5 | 37.0 |
| Corrugation value[1] | 0.06 | 1.0 |
| Tensile strength (kg/cm$^2$)[2] | | |
| Machine | 7.65 | 7.84 |
| transverse | 3.80 | 2.72 |
| Elongation (%)[3] | | |
| Machine | 94.5 | 79.5 |
| transverse | 80.0 | 71.3 |
| Tear strength (kg)[4] | | |
| Machine | 0.30 | 0.28 |
| transverse | 0.19 | 0.15 |
| Shrinkage factor (%)[5] | | |
| Machine | −12.5 | −17.6 |
| transverse | −9.6 | −3.8 |
| Stiffness (mm)[6] | | |
| Machine | 10 | 10 |
| transverse | 50 | 73 |

[1] Corrugation value = $\dfrac{\text{Average ridge height of corrugations (mm)}}{\text{Average pitch width of corrugations/2 (mm)}}$

[2] Tensile strength: JIS K-6767 was followed.
[3] Elongation: JIS K-6767 was followed.
[4] Tear strength: JIS K-6767 was followed.
[5] Shrinkage factor: The shrinkage factor of each foamed sheet was determined by forming a pair of spaced cuts in the foamed sheet in parallel with each of the machine direction and the direction perpendicular to the machine direction, namely, the transverse direction to obtain a sample of 20 cm × 20 cm, heating the sample for 15 seconds in an oven controlled at 100|C. and then measuring the dimensional change in each of the machine and transverse directions.
[6] Stiffness: A 100 mm × 150 mm sample was cut out from each foamed sheet. The stiffness of the foamed sheet was expressed by the degree of sagging of the foamed sheet when the sample was fixed at one of the sides, namely, the height between the fixed side and the opposite side.

COMPARATIVE EXAMPLES 2–4

Butane was added as a blowing agent to low-density polyethylene in an extruder in their corresponding proportions shown in Table 2, followed by melting and kneading. Each of the resultant composition was then extruded through an annular die whose diameter was 100 mm, thereby forming a foamed tubular body. The thus-formed tubular body was then cooled by means of a non-divided cylindrical cooling device having its corresponding diameter (MD) shown in Table 2 and a length (ML') of 1100 mm. Physical properties of the resultant sheets are shown in Table 2.

TABLE 2

|  | COMPARATIVE EXAMPLE 2 | COMPARATIVE EXAMPLE 3 | COMPARATIVE EXAMPLE 4 |
| --- | --- | --- | --- |
| AMOUNT OF BLOWING AGENT (wt. %) | 0.99 | 16.67 | 16.67 |
| DD (mm) | 100 | 100 | 100 |
| MD (mm) | 100 | 100 | 370 |
| DD/MD | 1 | 1 | 0.27 |
| EXPANSION RATIO (times) | 3 | 35 | 35 |
| THICKNESS (mm) | 2.5 | 2.5–4.5 | '3.0–3.5 |
| CORRUGATION VALUE | 0.04 | Unmeasurable At least 1.0 | 1.0 |
| REMARKS | Possible to take off foamed tubular body | Difficult to take off foamed tubular body | Possible to take off foamed tubular body |

EXAMPLES 2–3 AND COMPARATIVE EXAMPLE 5

Following the procedure of Comparative Example 4, compositions having the same formulation as that used in Comparative Example 4 were separately extruded to form foamed tubular bodies. The thus-formed tubular bodies were cooled by means of respective cylindrical cooling devices divided into two sections and having the same DD/MD ratio as that in Comparative Example 4 (ML' of the individual sections=750 mm, ML=2250 mm, MML=750 mm in the cylindrical cooling device in Example 2 and Comparative Example 5, and ML'=750 mm, ML=1760 mm, MML=260 mm in the cylindrical cooling device in Example 3) while feeding air into the foamed tubular bodies between the respective sections of the cylindrical cooling devices so as to give their corresponding internal pressures shown in Table 3. Physical properties of the resultant sheets are shown in Table 3.

TABLE 3

|  | EX. 2 | EX. 3 | COMP. EX. 5 |
| --- | --- | --- | --- |
| INTERNAL PRESSURE OF TUBE BETWEEN SECTIONS [kg/cm$^2$ (G)] | $4 \times 10^{-3}$ | $4 \times 10^{-3}$ | $3 \times 10^{-4}$ |
| EXPANSION RATIO (times) | 35 | 35 | 35 |
| THICKNESS (mm) | 3.3 | 3.3 | 3.1–3.4 |
| CORRUGATION VALUE | 0.06 | 0.09 | 0.9 |

We claim:

1. A process for producing a foamed polyolefin sheet comprising:

extruding a molten polyolefin resin, which contains a blowing agent, into a low-pressure zone through an annular extrusion die, having a ring diameter DD, provided at an end of an extruder to form a foamed tubular body, at an expansion ratio of 15 or higher;

bringing said foamed tubular body into contact with a peripheral surface of a cylindrical cooling device to cool said foamed tubular body, said cylindrical cooling device having an upstream section and at least one other spaced apart downstream section, said cylindrical cooling device having a maximum diameter MD, wherein DD/MD=0.1–0.5;

introducing a gas into said foamed tubular body between said annular extrusion die and said upstream section of said cylindrical cooling device and also between at least two adjacent sections of said cylindrical cooling device to increase to from about $5 \times 10^{-4}$ to $3 \times 10^{-2}$ kg/cm$^2$ (G) an internal pressure of said foamed tubular body to apply tension to said foamed tubular body at an inner wall and prevent the formation of corrugations; and slitting said thus-cooled foamed tubular body in the direction of extrusion to open same;

wherein said cylindrical cooling device satisfies the following inequalities:

$5 > ML'/MD > 1.5$ $3 > MML/ML' > 0.34$ $0.28 > MD/ML > 0.04$ wherein

ML' is a length of a section of said cylindrical cooling device,

MD is said maximum diameter of said cylindrical cooling device,

MML is a length of an interval between adjacent sections of said cylindrical cooling device, and ML is a length of said cylindrical cooling device from an upstream end of said upstream section to a downstream end of a most downstream section.

2. The process as claimed in claim 1, wherein 1–40 parts by weight of butane are used as the blowing agent per 100 parts by weight of low-density polyethylene.

3. The process as claimed in claim 1, wherein said maximum diameter MD of said cylindrical cooling device is within the range of 150–1,000 mm and a length ML of said cylindrical cooling device from an upstream end of said upstream section to a downstream end of a most downstream section is within the range 300–15,000 mm.

4. A process for producing a foamed polyolefin sheet comprising:

extruding a molten polyolefin resin, which contains a blowing agent, into a low-pressure zone through an annular extrusion die, having a ring diameter DD, provided at an end of an extruder to form a foamed tubular body, at an expansion ratio of 15 or higher;

bringing said foamed tubular body into contact with a peripheral surface of a cylindrical cooling device to cool said foamed tubular body, said cylindrical cooling device having an upstream section and at least one other spaced apart downstream section, said cylindrical cooling device having a maximum diameter MD, wherein $DD/MD = 0.1-0.5$;

introducing gas into said foamed tubular body between said annular extrusion die and said upstream section of said cylindrical cooling device and also between at least two adjacent sections of said cylindrical cooling device, to increase to from about $1 \times 10^{-3}$ to $1 \times 10^{-2}$ kg/cm$^2$ (G) an internal pressure of said foamed tubular body to apply tension to said foamed tubular body at an inner wall and prevent the formation of corrugations; and slitting said thus-cooled foamed tubular body in the direction of extrusion to open same;

wherein said cylindrical cooling device satisfies the following inequalities:

$5 > ML'/MD > 1.5$ $3 > MML/ML' > 0.34$ $0.28 > MD/ML > 0.04$ wherein

ML' is a length of a section of said cylindrical cooling device,

MD is said maximum diameter of said cylindrical cooling device,

MML is a length of an interval between adjacent sections of said cylindrical cooling device, and ML is a length of said cylindrical cooling device from an upstream end of said upstream section to a downstream end of a most downstream section.

* * * * *